(12) United States Patent
Schlensker et al.

(10) Patent No.: US 8,906,144 B2
(45) Date of Patent: Dec. 9, 2014

(54) COMPACT ADSORPTION DRYER

(75) Inventors: Herbert Schlensker, Leverkusen (DE);
Johannes Sinstedten, Korschenbroich (DE)

(73) Assignee: Beko Technologies GmbH (DE)

( * ) Notice: Subject to any disclaimer, the term of this patent is extended or adjusted under 35 U.S.C. 154(b) by 10 days.

(21) Appl. No.: 13/809,670

(22) PCT Filed: Jul. 11, 2011

(86) PCT No.: PCT/EP2011/061776
§ 371 (c)(1),
(2), (4) Date: Mar. 1, 2013

(87) PCT Pub. No.: WO2012/007433
PCT Pub. Date: Jan. 19, 2012

(65) Prior Publication Data
US 2013/0199374 A1  Aug. 8, 2013

(30) Foreign Application Priority Data
Jul. 13, 2010  (DE) .......................... 10 2010 036 382

(51) Int. Cl.
*B01D 53/02* (2006.01)
*B01D 53/04* (2006.01)
*B01D 53/26* (2006.01)

(52) U.S. Cl.
CPC .......... *B01D 53/0415* (2013.01); *B01D 53/261* (2013.01); *B01D 2257/80* (2013.01); *B01D 2258/06* (2013.01); *B01D 2259/40086* (2013.01); *B01D 2259/402* (2013.01)
USPC ................... 96/133; 96/134; 96/149; 96/151; 55/475; 55/484; 55/516; 55/518; 210/264; 210/282; 210/290

(58) Field of Classification Search
USPC ........... 55/179, 316, 387, 475, 484, 516, 518; 210/264, 282, 290; 96/133, 134, 149, 96/151
See application file for complete search history.

(56) References Cited

U.S. PATENT DOCUMENTS 4,673,420 A  6/1987  Haker et al.
5,403,387 A  4/1995  Flynn et al.
(Continued)

FOREIGN PATENT DOCUMENTS

DE  10355928  6/2005

OTHER PUBLICATIONS

ISR PCT/EP2011/061776 dated Jan. 25, 2012.

*Primary Examiner* — Christopher P Jones
(74) *Attorney, Agent, or Firm* — Cantor Colburn LLP (57) ABSTRACT

An adsorption dryer (20) for processing gases, in particular compressed air, having a control head (24) with valves (28), pipe connections (26) and means for receiving cartridges, and at least two cartridges (22) which can be connected to the control head (24) and are filled with adsorption means and to which a stream of fluid can be supplied, as required, via the control head (24). The cartridges (22) each have a cover (30), a cartridge casing (32), a base (34) and a central pipe (36) which extends through the cover (30) into an interior space (46) of the cartridge (22). The adsorption dryer (20) is characterized in that the cover (30), the cartridge casing (32) and the base (34) of the cartridges (22) can each be secured in place with respect to one another via the central pipe (36), the central pipe (36) in each case projects out of the cartridge (22) and serves as a connecting means for the control head (24), and the cartridge (22) itself is of compression-resistant design. The ends of the cartridges (22) are free from any connecting and valve technology.

11 Claims, 5 Drawing Sheets

(56) References Cited

U.S. PATENT DOCUMENTS

| | | | |
|---|---|---|---|
| 5,779,772 A * | 7/1998 | Unger et al. | 96/137 |
| 6,692,556 B2 * | 2/2004 | Hayes et al. | 96/147 |
| 2009/0199522 A1 * | 8/2009 | Hilberer | 55/385.1 |

* cited by examiner

COMPACT ADSORPTION DRYER

FIELD

The disclosure relates to an adsorption dryer for the treatment of gases, more particularly to an adsorption dryer for the treatment of compressed air.

BACKGROUND

Adsorption dryers are generally designed in a cold regenerating manner and have been in use for a long time. Of two adsorber containers or cartridges filled with desiccating agent, one adsorber container dries the gas flow supplied via the control head by means of adsorption, while the other adsorber container regenerates the desiccating agent with a regeneration gas flow. As a rule, a partial flow of the dried gas flow depressurised to ambient pressure is used as the regeneration gas flow. The duration of the regeneration phase approximately corresponds to the duration of the adsorption phase whereby the regeneration phase is divided into an active regeneration phase with a flow of regeneration air and a passive regeneration phase without a flow of regeneration air.

Before reaching the intake capacity of the desiccating agent, with the aid of switching valves the fluid flows are switched over which exchanges the functions of both adsorber containers. This means that both containers switch between adsorption and regeneration and therefore also between operating pressure and ambient pressure.

The normally used desiccating agent only has a limited lifespan so that replacement is unavoidable. The lifespan of the desiccating agent is primarily dependent on the local operating conditions. The replacement of the desiccating agent and, depending on the design of the adsorption dryer, also of other operating means or the entire control head is laborious and requires specialist knowledge. For example, when filling with desiccating agent it is important that the adsorber containers are uniformly and compactly filled with desiccating agent in order to prevent any movement of the individual spherules of the desiccating agent when the gas to be dried flows through. This prevents inadmissible wear and the formation of open flow channels.

An adsorption dryer of this type is described in DE 103 55 928 A1. In this dryer two adsorber containers can be used in one control head so that after detaching the adsorber containers the control head can remain in place in the fluid system via the pipe connections. All the valves are arranged in the control head and can, if necessary, be separately exchanged. The adsorber containers are each formed by a housing that has a base, a container casing and a cover. The desiccating agent is contained in the adsorber container, or alternatively a desiccating agent cartridge can be inserted. The adsorber container and the control head are screwed together by way of an internal thread on the adsorber containers and an external thread arranged on the control head. In order to ensure a defined fluid supply a container head is envisaged as a further component which is inserted between an adsorber container and the control head. It is described as being advantageous that before screwing on the adsorber container the container head must be preassembled on the fixed section so that it is held in the correct position there. Pressure tightness is brought about by screwing on the adsorber container.

SUMMARY

In principle the proposed device improves the maintenance and servicing of the adsorption dryer on site, but the design is complicated and the replacement of the adsorber containers on site is not rapidly and easily possible. Furthermore, variations to the length and diameter of the adsorber containers in order to match the local circumstances are only possible at considerable expense. Due to the threaded connections the outer diameter of the adsorber container and the connection area of the control head are predetermined.

An exemplary objective would be to create an adsorption dryer which allows rapid and simple maintenance and servicing on site. In particular, it should be possible to replace the adsorber containers quickly and easily. Adaptation of the dimensions of the adsorber containers to the local circumstances should be possible without costly structural measures. Finally the pressure tightness of the adsorber containers in operation should meet the highest requirements. The disadvantages of the prior art should be avoided.

This task is solved by an adsorption dryer in which
- the cover, the cartridge casing and the base of the cartridges can be braced together via the central tube,
- the central tube projects from the cartridge and acts as a connection means for the control head,
- the cartridge itself is pressure tight.

Cartridges are therefore proposed as adsorber containers which are already pressure-tight so that the pressure-tightness of the system or the adsorption dryer is not brought about only at the time of installation on site. In the event of replacement of the cartridges they can be removed from the adsorption dryer and replaced with new or already newly filled cartridges. The cartridges with spent desiccating agent are refilled at the manufacturing plant or a servicing company, whereby the pressure-tightness of the cartridges can be tested in advance at the works. This minimises the risk of leakage during the replacement of the cartridges.

The cartridges are connected to the control head directly via the central tube itself. In a particularly advantageous embodiment variant one free end of the central tube projects from the cartridge or the cover and can be inserted into a corresponding opening of the control head. For this the central tube can have a thread, for example on the outer side of the tube, which can be screwed into an internal thread of the control head opening, though preferably a quick connector is envisaged. Such quick connector or simplified connection devices are already known in compressed air technology. For example, the central tube can at its free end, i.e. the connection area, have several circumferential grooves into which a corresponding element of a connection element arranged in the control head engages. In this case the cartridges only have to be pressed or inserted into one of the openings of the control head and the connection area of the central tube then interlocks within the control head and a pressure-tight connection is guaranteed. Alternatively a screw-connection is conceivable whereby suitable sealing elements bring about adequate tightness. The sealing element can be designed as sealing rings, for example, which are held in the grooves.

An advantage also consists in the fact that filling of the cartridges can be carried out by the manufacture thereby meeting the highest requirements. A denser filling can be achieved, which in operation is almost wear-free. Errors during filling and unwanted container leaks are therefore practically ruled out.

The control head contains the entire valve technology and the necessary pipe connections and container connections. The second end of the cartridges is therefore free of any connection and valve technology, which makes replacement of the cartridges very simple. This also makes simple maintenance and servicing of the control head possible, whereby, for example, replacement of the entire control head with subsequent continued use of the not yet fully used up cartridges is conceivable. Different control head sizes with the same cartridge size are possible without problem as the only prerequisite for a functional adsorption dryer is the connection of the connection area of the central tube with the control head.

As the central tube itself is used as a tensioning rod which braces the cover and the base of the cartridge against the cartridge casing, adaptation of the size and dimensions of a cartridge to, for example, the conditions on site, or when changing a production series is also rapid, simple and problem-free. The diameter and length of a cartridge are irrelevant for a possible connection to a control head already used on site, only the diameter and design of the connection area of the central tube are of relevance. Thus, for example, the length of a cartridge can be easily and simply changed by replacing the cartridge casing and the pressure-tightness is guaranteed by bracing the components to each other.

In the case of the cartridge described herein there are two different possibilities of introducing the fluid. In a first variant the fluid is introduced through one or more openings in the cover into the desiccating agent, in the base area of the cartridge it then flows through central tube openings into the central tube and is directed back into the control head via the central tube. To regenerate the cartridge the flow direction is reversed, flushing air is introduced via the central tube and through the openings in the base into the desiccating agent and the desiccating agent is thus regenerated.

In the second embodiment variant, the flow direction is reversed. The fluid flows through the central tube to the base area, emerges there from the central tube and flows from the bottom to the top through the desiccating agent and finally back out of the cartridge through the cover openings.

The second variant is preferably used when the cartridges are arranged suspended in the control head. In the base area after the central tube drops of condensation many drip off, collect and remain there. A chamber can be provided for this. Alternatively the chamber/room can be advantageously filled with desiccating agent. During regeneration (re-drying through flushing air) this moisture is then automatically also removed, the condensation does not have to be manually drained. A separate chamber or separate room for produced condensation can be beneficial but is not absolutely necessary.

According to both embodiment variants, in the area where the fluid emerges from the desiccating agent, i.e. in the first variant before the central tube openings and in the second variant before the cover openings, a filter element can be provided. This prevents removal of worn desiccating agent from the cartridge.

A silencer can be provided which is arranged between the cartridges, for example, and considerably reduces the noise development of the adsorption dryer.

A suspended arrangement of the cartridges in the control head has proven to be particularly advantageous. This means that the cartridges are inserted from below into openings or connection means of the control head and hang freely therein. Alternatively an inverse arrangement is possible, namely the cartridges are inserted into the control head from above and stand on it, so to speak. Finally a lateral arrangement is conceivable in which the cartridges are aligned horizontally, for example, if this should be advantageous given the local conditions.

In this case the control head openings are arranged accordingly. The adsorption dryer can have a wall mount, but depending on the design of the pipeline such a wall mount can also be dispensed with.

The cover, the base and the cartridge casing are preferably sealed with regard to each other by means of suitable seals, for example O-rings. To enable the elements to be braced to each other the central tube can have a thread on its outer side onto which the base of the cover can be screwed. It is also conceivable for the base and cover to simply be pushed via openings onto the central tube and tensioned by an externally applied nut. In this case the central tube not only extends through the cover but also through the base of the cartridge so that at the cover side the central tube then forms the connection area for the control head and at the base side a tensioning section with an external thread.

As the cartridge is already pressure-tight, a further pressure-tight housing surrounding the cartridge is not necessary.

As a result of omitting the housing material and weight are saved which is also advantageous during the installation of the adsorption dryer on site. The lower weight of the adsorption dryer improves the possibilities of suspended installation and also makes the servicing work easier. Through omitting the casing the adsorption dryer is smaller overall, which is particularly advantageous in the case of adsorption dryers with a lower output as these are often operated close to end points and/or are used as built-in devices.

The adsorption dryer can be designed for the most varied of requirements, it is particularly suitable for fluid flows of around 3 $Nm^3$/h to around 150 $Nm^3$/h (standard cubic meters of air per hour).

The adsorption dryer is particularly suitable for combination with an inlet filter (ultra-fine filter), which can preferably also be integrated into the adsorption dryer. It has an interface for the transmission of alarm and servicing messages and is preferably electronically controlled. A second inlet filter (microfilter) can also be provided.

The control head can include means which allow pivoting of the control head with the installed cartridges. By pivoting the entire control head with the cartridges they can be brought into a position in which there is sufficient space for removing and inserting the cartridges. It is also conceivable that not the entire control head is pivotable, but only the area that has means for connecting the cartridges to the control head. In contrast, a second area, which has the pipe connections, for example, remains in position. In this embodiment variant the control head is divided into a pivoting and non-pivoting section.

The control head can also have means in the form of connection pieces which through assembly in different positions allow the inlet and outlet connections to be changed. In this way reversing of the control head flow direction in the pipeline is possible. This is of advantage for adapting to the conditions at the site if installation.

BRIEF DESCRIPTION OF THE FIGURES

The embodiments will be explained in more detail with the aid of the following figures. The shown embodiment variants should only be seen as examples and should not be restricted to them. In these.

DETAILED DESCRIPTION

Figure 1:
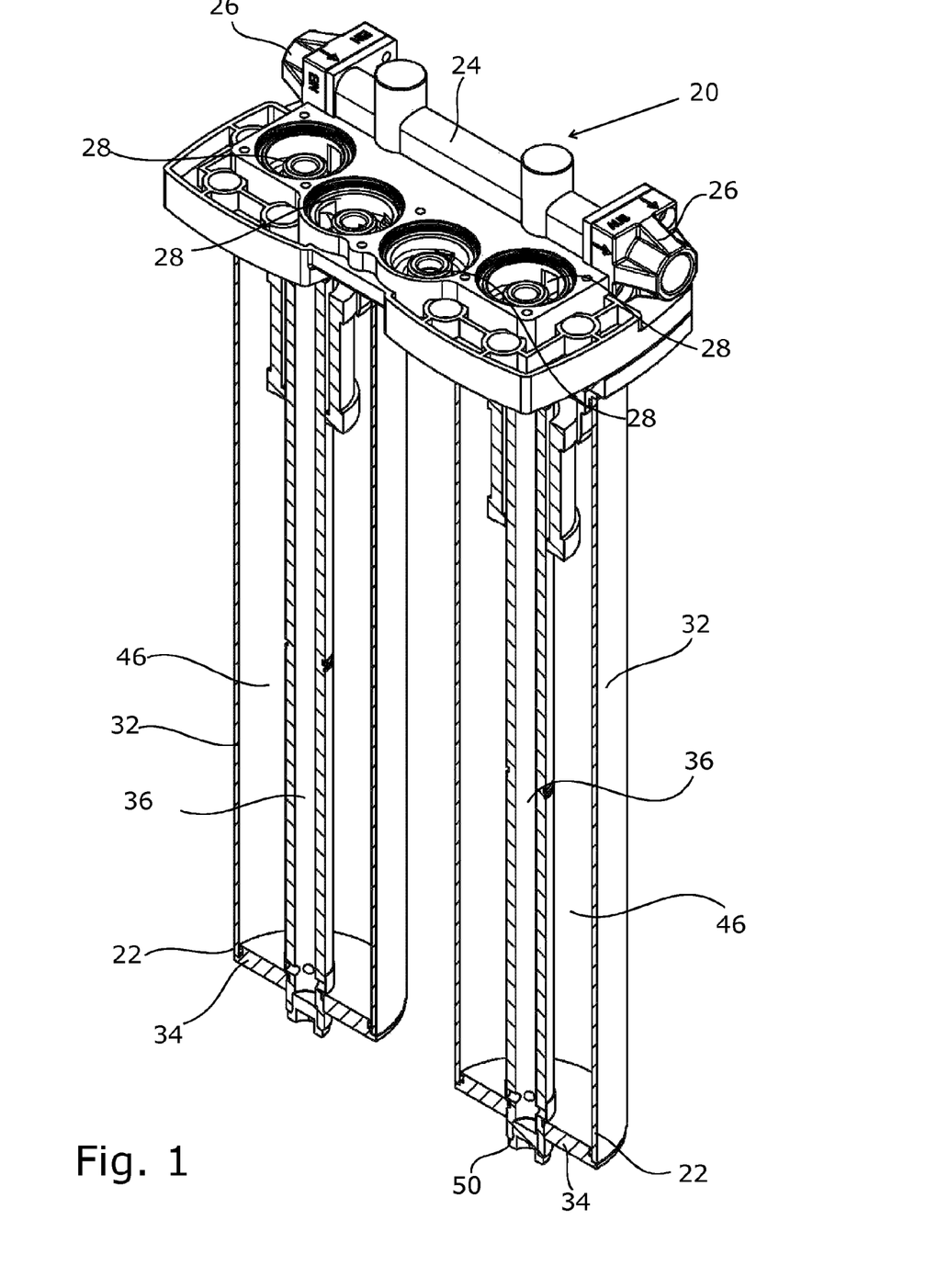
FIG. 1: shows a cross-section of an adsorption dryer with suspended cartridges.
Figure 2:
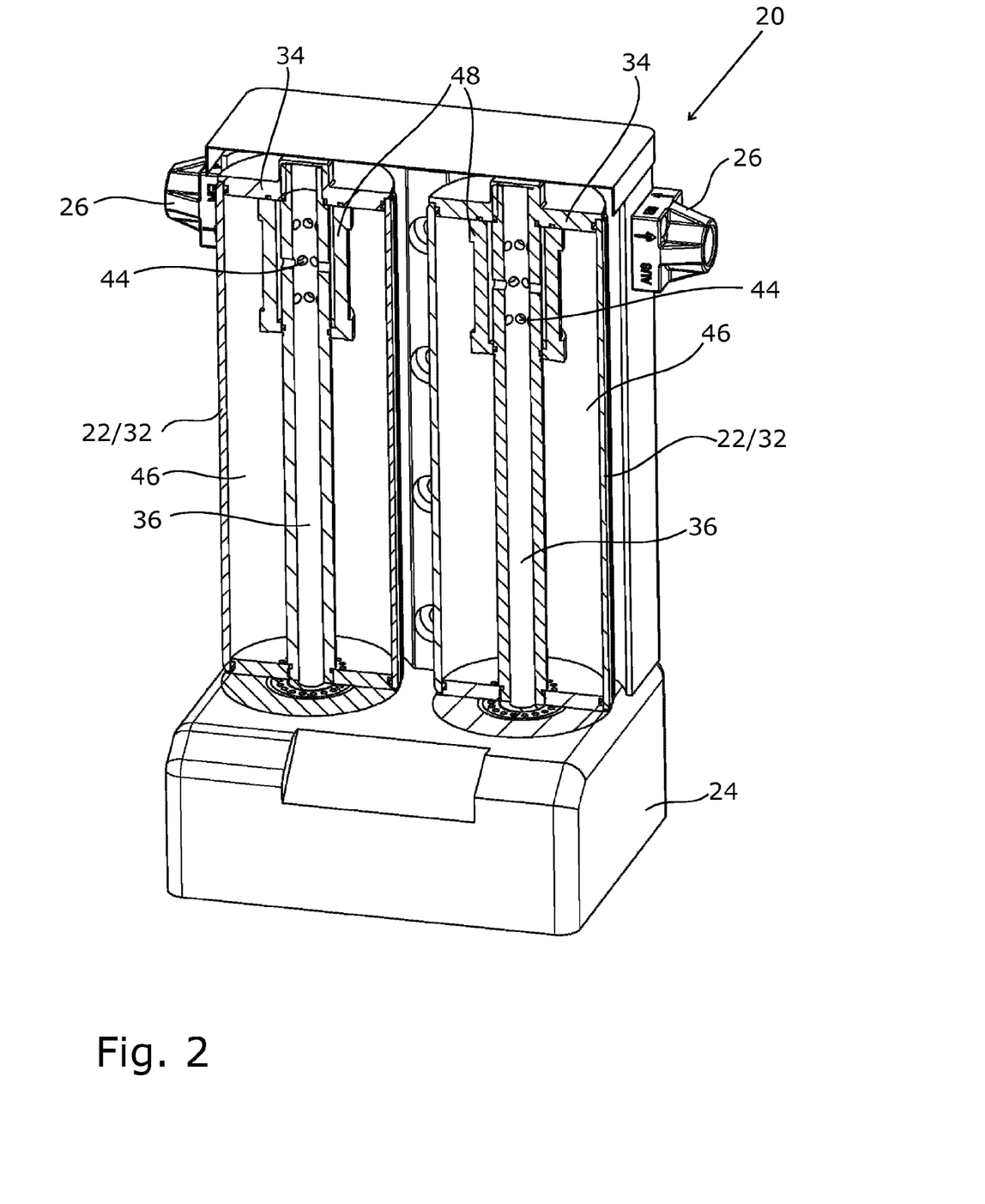
FIG. 2: shows a partial cross-section of an adsorption dryer with the invention with standing cartridges.

FIGS. 1 and 2 show two different embodiment variants of an adsorption dryer 20. Two adsorber containers or cartridges 22 are inserted into a control head 24, suspended in accordance with FIG. 1 and standing in accordance with FIG. 2. A horizontal arrangement of the cartridges 22 is also possible, ultimately the cartridges 22 can be inserted into the control head 24 in any position and at any angle, always dependent on the design of the control head 24 and the conditions on site.

The control head 24 also contains pipe connections 26, valves 28 and means (not shown) for connecting the control head 24 to the cartridges 22. In the shown embodiment variant four pre-controlled membrane valves as well as ball check valves on the outlet side are provided.

As can be seen in FIGS. 1 to 4 the cartridges 22 have a cover 30, a cartridge casing 32 and a base 34. A central tube 36 is arranged within the cartridge and extends through the cover 30 and, depending on the embodiment variant, also through the base 34. At the cover side there is therefore a free end of the central tube 36 that serves as a connection area for the control head 24. The individual elements of the cartridges 22 are sealed with regard to each other by sealing means which are arranged in sealing means grooves 38 provided therefor. The cartridges 22 are thus pressure-tight.

Figure 3:
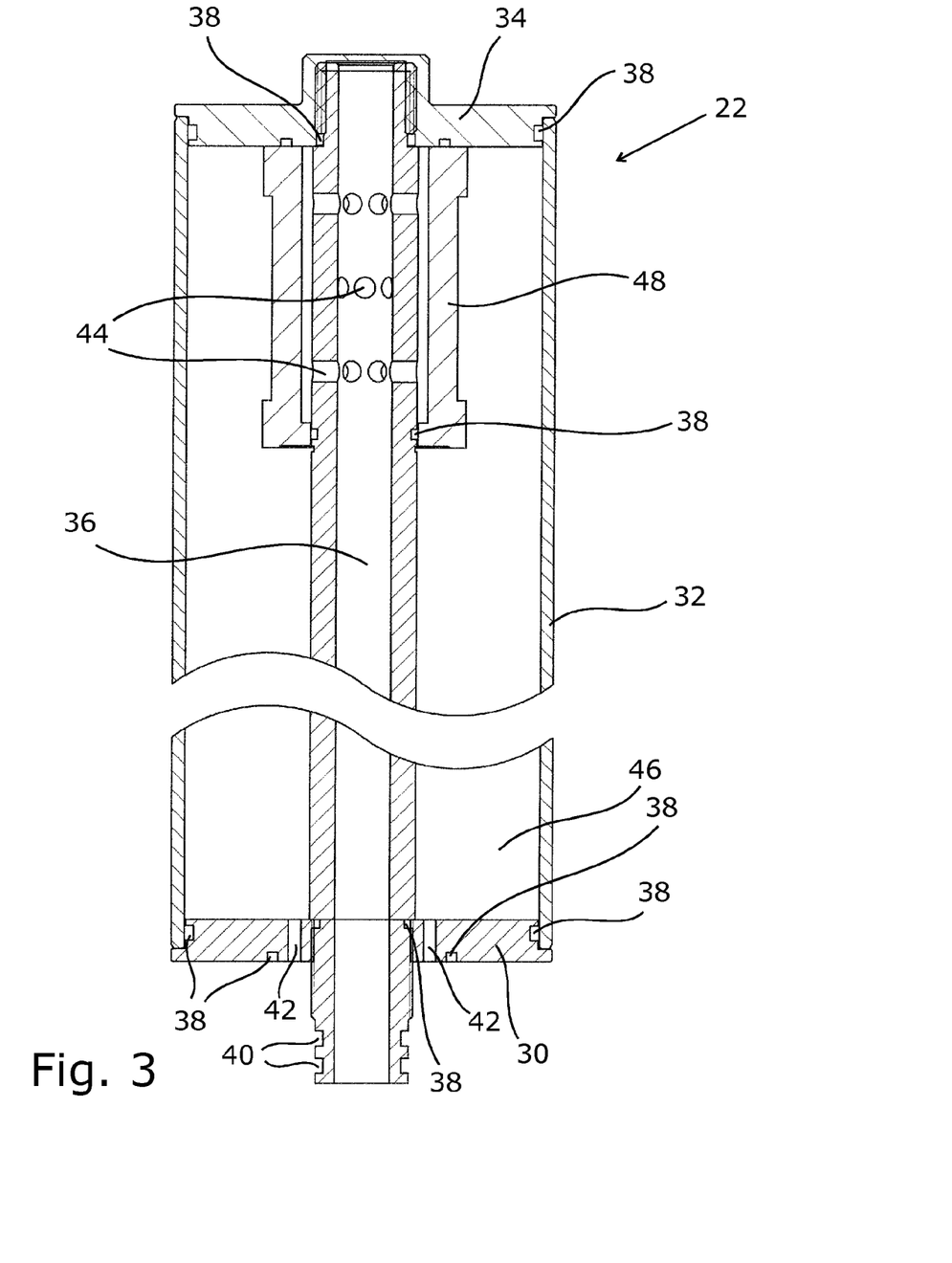
FIG. 3: shows a cross-section of a cartridge.
Figure 4:
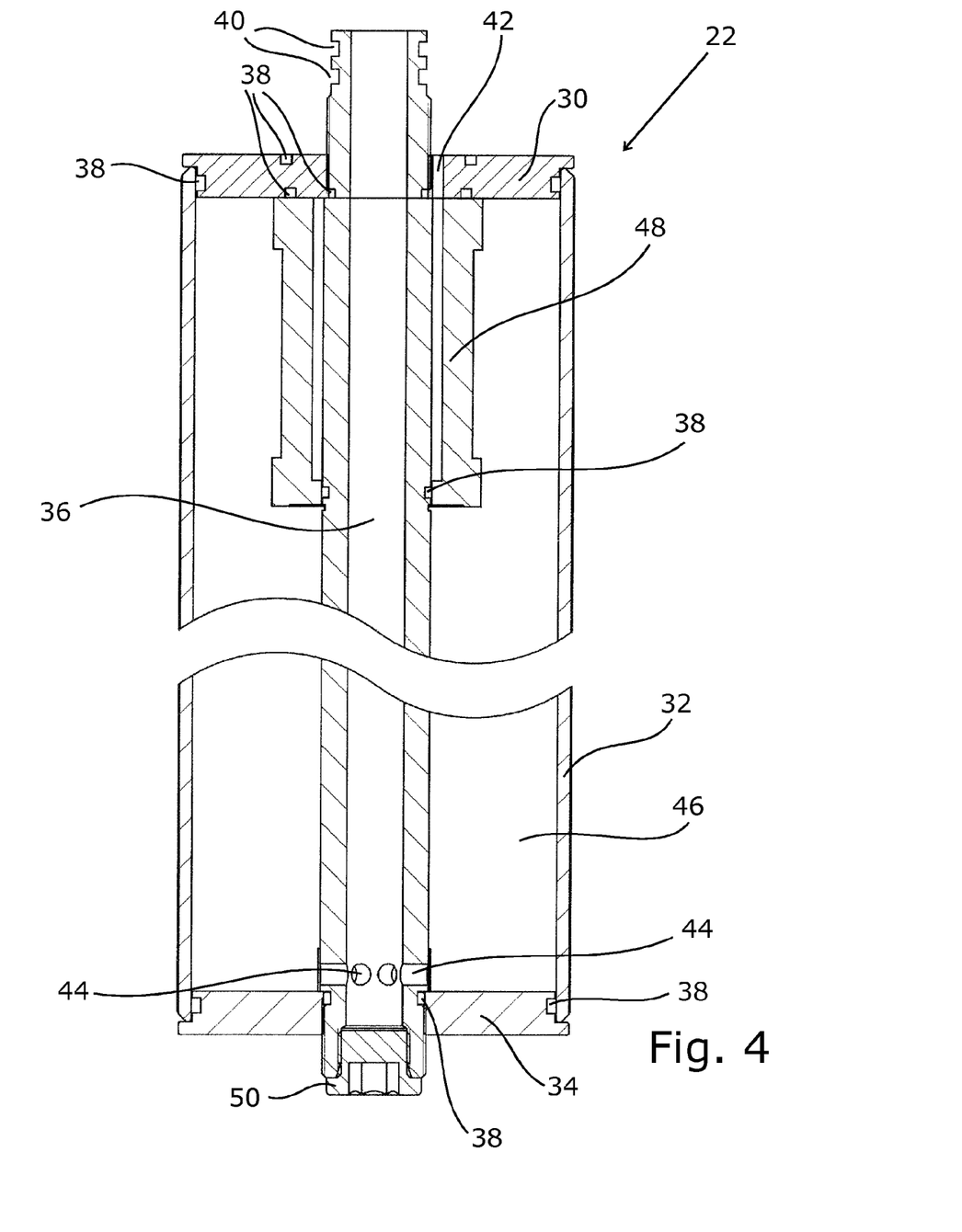
FIG. 4: shows a cross-section of a second embodiment variant of a cartridge.

In the shown example of embodiment in accordance with FIGS. 3 and 4 the cartridges 22 are provided with threads and sealing rings in the grooves 40 which only have to be screwed into corresponding means in the control head 24 for connecting the cartridges 22 with the control head 24. Alternatively a bayonet or plug-type connection, for example, is also conceivable. In this case a screw connection and multiple turning of the cartridges 22 about their own axis are then not necessary. For this the central tube 36 has connection grooves 40 in the connection area which interact with corresponding means of the control head 24. In the cover 30 cover openings 42 and in the central tube in the base area central tube openings 44 can be seen.

The embodiment variant in accordance with FIG. 3 is particularly suitable for standing insertion into a control head 24. This means that the connection hears of the central tube 36 is inserted from above into a corresponding opening of the control head 24. The fluid is introduced through the cover openings 42, which in this embodiment variant face the control head, in to an interior 46 of the cartridge 22 which is filled with adsorption agent (not shown). It can also be seen that in this embodiment variation the central tube 36 does not project through the base 34.

The introduced fluid rises through the desiccating agent and reaches an outlet dust filter 48 which retains loosened or worn adsorption agent before entering the central tube openings 44 and finally the central tube 36.

The embodiment variant in accordance with FIG. 4 is particularly suitable for suspended insertion into a control head, with the connection area of the central tube 36 being inserted into the control head 24 from below. In this embodiment variant the fluid passes through the central tube 36 into the cartridge 22 and emerges through central tube openings 44 in the base area into the adsorption agent. In the interior 26 it then rises up to the outlet dust filter 48, flows through this and escapes through the cover opening 42. In this embodiment variant the central tube 36 extends through the base 34 and is closed off by means of a closing cap 50.

Figure 5:
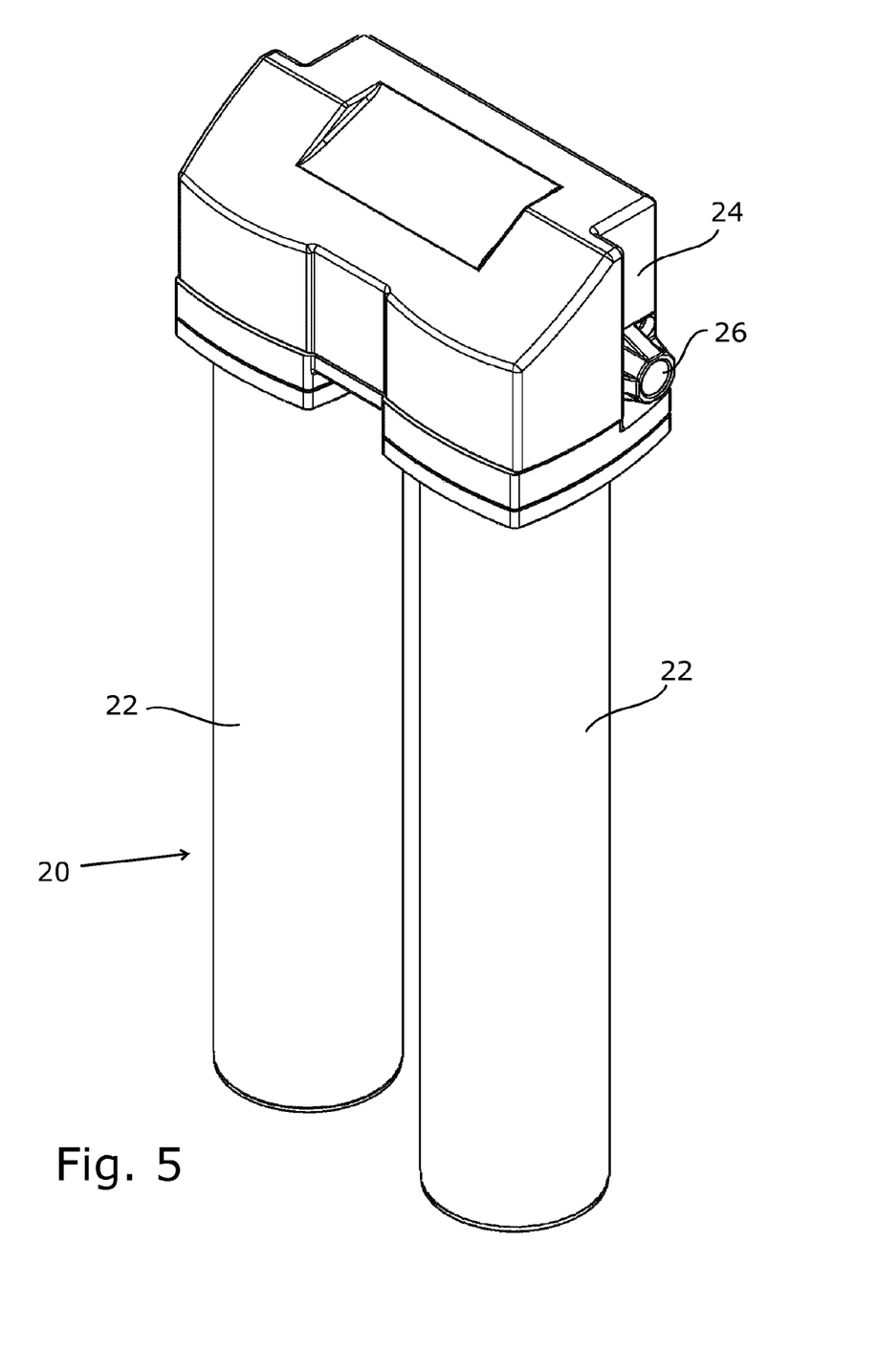
FIG. 5: shows a side view of an adsorption dryer in accordance with FIG. 1.

FIG. 5 shows a side view of the adsorption dryer in accordance with FIG. 1. One of the I advantages becomes particularly clear in this view, namely that the free ends of the cartridges 22 are free of connection and valve technology.

The invention is not restricted to the shown embodiment variants, but rather, a suspended arrangement of the embodiment variation in accordance with FIG. 3 or standing use of the embodiment variation in accordance with FIG. 4 is also possible for example. The same applies to the different designs of the base areas. Both for the standing and the suspended variant both types of fastening of the base 34 can be used.

The invention claimed is:

1. An adsorption dryer for the treatment of gases, more particularly compressed air comprising:
    a control head with valves, pipe connections and means for holding cartridges,
    at least two cartridges, which can be connected to the control head and are filled with adsorption agent, to which a fluid flow can be supplied via the control head as required and the free ends of which are free of any connection and valve technology,
    whereby the cartridges have a cover, a cartridge casing, a base and a central tube which extends through the cover into an interior of the cartridge,
    wherein the cover, the cartridge casing and the base of the cartridges can be braced together via the central tube,
    wherein the central tube projects from the cartridge and acts as an only connection means for the control head, and
    wherein the cartridge itself is pressure tight even when the cartridge is not connected to the control head.

2. The adsorption dryer according to claim 1, wherein an area of the central tube outside the cover serves as a connection area for connection to the control head.

3. The adsorption dryer according to claim 1, wherein the connection area of the central tube and the means for holding the cartridges are designed as a quick connector.

4. The adsorption dryer according to claim 3, wherein the quick connector is designed as a plug-type connection.

5. The adsorption dryer according to claim 3, wherein the quick connector is designed as a bayonet connection.

6. The adsorption dryer according to claim 1, wherein the cartridges are suspended in the control head.

7. The adsorption dryer according to claim 1, wherein the cartridges stand on control head.

8. The adsorption dryer according to claim 1, wherein an outlet dust filter is arranged in the interior of the cartridges.

9. The adsorption dryer according to claim 1, wherein by changing a connection piece the inlet and outlet connections can be interchanged.

10. The adsorption dryer according to claim 1, wherein the cartridges can be pivoted in the inserted condition.

11. An adsorption dryer for the treatment of gases, more particularly compressed air comprising:
    a control head with valves, pipe connections and means for holding cartridges,
    at least two cartridges, which can be connected to the control head and are filled with adsorption agent, to which a fluid flow can be supplied via the control head as required and the free ends of which are free of any connection and valve technology,
    whereby the cartridges have a cover, a cartridge casing, a base and a central tube which extends through the cover into an interior of the cartridge,
    wherein the cover, the cartridge casing and the base of the cartridges can be braced together via the central tube, wherein the central tube projects from the cartridge and an area of the central tube outside the cover serves as an only connection area for connection to the control head; and wherein the cartridge itself is pressure tight.

* * * * *